United States Patent [19]

Hathcock

[11] Patent Number: 4,776,605

[45] Date of Patent: Oct. 11, 1988

[54] WHEELED BED APPARATUS

[76] Inventor: John E. Hathcock, 4285 Powell Ave., Memphis, Tenn. 38122

[21] Appl. No.: 74,025

[22] Filed: Jul. 16, 1987

[51] Int. Cl.[4] ......................... A47C 17/16; B62M 1/14

[52] U.S. Cl. ......................... 280/242 R; 280/242 WC; 280/289 WC; 297/DIG. 4; 5/86

[58] Field of Search ............... 280/242 WC, 289 WC; 5/81 R, 86, 174, 201, 202; 297/DIG. 4, 84

[56] References Cited

U.S. PATENT DOCUMENTS

| | | | |
|---|---|---|---|
| 3,122,395 | 2/1964 | Offner | 297/DIG. 4 |
| 3,483,574 | 12/1969 | Belnap | 312/213 |
| 4,042,250 | 8/1977 | Rodaway | 297/DIG. 4 |
| 4,285,541 | 7/1981 | Onishi | 5/81 |

*Primary Examiner*—John J. Love
*Assistant Examiner*—Donn McGiehan
*Attorney, Agent, or Firm*—Richard C. Litman

[57] ABSTRACT

A wheeled bed apparatus includes a planar supporting surface stretched between a plurality of upper longitudinal and transverse tubular members forming a patient platform. The platform is pivotably affixed to a plurality of vertical tubular support members maintained in an erect, use position by a plurality of transverse frame members and diagonal braces. Hand wheels associated with two large supporting wheels permit propulsion of the apparatus by a patient while reposing atop the supporting surface. Coupling elements joining the various tubular members permit collapsing of the apparatus for storage.

3 Claims, 1 Drawing Sheet

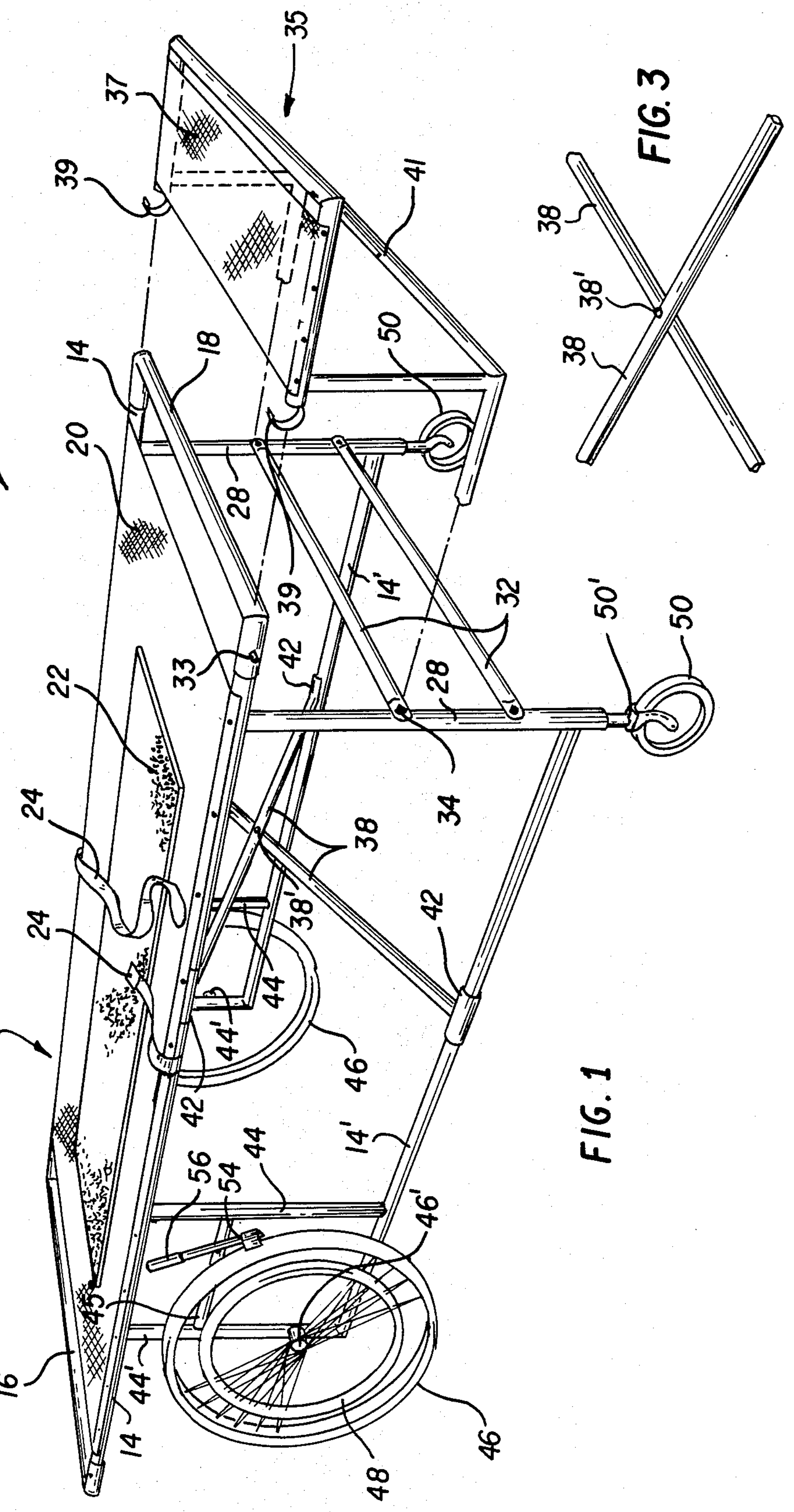
FIG. 3
FIG. 1
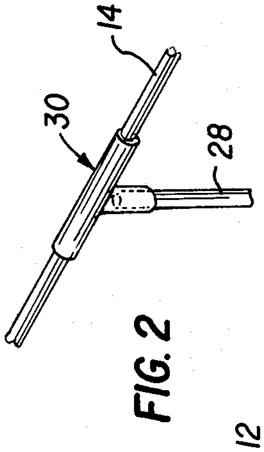
FIG. 2

WHEELED BED APPARATUS

BACKGROUND TO THE INVENTION

1. Field of the Invention

The present device relates to wheeled gurneys or stretchers and specifically to a device for the convenient use by the patient himself, by the hospital staff and by maintenance personnel in that the device is easily and conveniently stored when not needed. In large modern hospitals today a number of problems occur relating to the health and comfort of patients and also to facilities management. Specifically, many types of beds and stretchers require storage and selective usage depending on the particular demands of the medical needs of the patients at the time.

Many types of gurneys and wheeled stretchers are known. The present invention relates to foldable or collapsible gurneys such that the under-carriage or gurney support apparatus as hereinafter described, can be separated from the stretcher and/or conveniently folded and stored. This device may be optionally utilized with a variety of other types of specialized stretchers or patient support surfaces.

Patients who are bedridden must remain in bed and often suffer emotional letdown, in addition to the physical discomfort, as a direct result of not being independently mobile. By the present device, even though a patient is confined to a supine on face-down position, he may wheel the device, thereby becoming mobile, albeit in a limited way.

Many patients, for example, would want to slightly turn the angle of their bed to a window, or better to see a T.V. set, or to more conveniently converse with a visitor. Often it isn't important that the patient be able to self-propel himself out of the room so much as to be allowed a small measure of selfmobility This mobility permits the patient to adjust to whatever stimulus has their attention at the moment and thereby answers the need for many patients to be able to move themselves without calling for a nurse or nursing assistant to help them.

2. Description of the Prior Art

The following U.S. Patents are found to be examplary of the U.S. prior art. They are:

| U.S. Pat. No. | Inventor |
|---|---|
| Onishi | 4,285,541 |
| Iannucci | 3,839,755 |
| Ahrent et al | 3,406,772 |
| Jones et al | 3,379,450 |

Onishi discloses a wheelchair that unfolds to a bed. However, as a bed the Onishi device has no self-perambulation capability but is simply considered as a substitute for a wheeled stretcher or a place to sleep in situ.

Iannucci teaches a mobile bed with an adjustable inclined surface for supporting the occupant with an adjacent, fixed, horizontal surface for miscellaneous uses.

Ahrent, et al discloses a wheel-type chair-bed with hydraulic pistons for moving the supportive members into different operational positions.

Jones, et al discloses a wheelchair device adjustable to a plurality of frame configurations permitting a range of sitting, standing, and prone positions of the occupant. None of the aforementioned devices disclose a configuration with the simplicity, economy and utility of the present device.

SUMMARY OF THE INVENTION

The wheeled bed, stretcher or gurney support apparatus of the present invention utilizes upper and lower longitudinal tubular frame members to which tubular vertical support members are attached. The vertical support members are reinforced structurally by a combination of of transverse support members and a pair of diagonal brace members such that the combination of the aforementioned structural members and braces are slidably disposed one to another so that the assembled under-carriage or gurney support apparatus is detachable from a planar stretcher surface on which the patient reclines.

Further, as the patient reclines, maintaining a prone position, the device provides for a set of drive wheels such that a first set is tangential to the floor and a second set is interior of the first, allowing the patient to selectively apply handpower to one or another wheel for the positional adjustment or mobility of the bed.

An object of the present invention is to provide an improved stretcher device including drive means allowing a reclining patient to propel himself.

BRIEF DESCRIPTION OF THE DRAWINGS

FIG. 1 is a perspective view showing the wheeled bed in a preferred embodiment.

FIG. 2 is an enlarged detail view showing a curvilinear coupling which may be used for pivotally connecting one element of the device to another element.

FIG. 3 is a diagonal support brace which may be utilized.

DESCRIPTION OF THE PREFERRED EMBODIMENT

Referring now to the drawing, particularly FIG. 1, the wheeled gurney 10 includes an uppermost patient platform 12 having laterally adjacent upper tubular longitudinal frame members 14—14 which are rigidly affixed to front and rear transverse upper support members 16 and 18 respectively.

A planar patient supporting surface 20 is stretched between the top longitudinal side tubular frame members 14, being attached thereto and further having a pliable planar cushion surface 22 contained upon the stretcher surface 20. Straps 24 are attached to the members 14 to constrain a patient from falling from the apparatus.

Vertical tubular support members 28, 44 are each rigidly fastened to the upper tubular longitudinal frame members 14.

Secondary transverse frame members 32 extend between the vertical tubular support members 28 and are positioned on the vertical members and are secured by any suitable separable coupling members 34.

A pair of tubular horizontal frame members 14 span and are affixed to the respective tubular vertical supports 28, 44, with the lower ends of the vertical supports 44 terminating at the lower, lateral horizontal members 14' while the supports 28 extend downwardly to accommodate casters 50.

A first diagonal brace member 38 is disposed between one upper longitudinal frame member 14 on one side of the apparatus and one lower longitudinal frame member 14' on the other side of the apparatus.

A second diagonal brace member 38 is disposed between the other upper longitudinal frame member 14 on one side of the apparatus and the other lower tubular frame member 14' on the other side of the apparatus, secured by any suitable fastener such as a nut and bolt 38'.

As a load is imposed upon the support apparatus from above, by weight of the stretcher frame itself or by the weight of a patient, the diagonal braces 38 pivot about the threaded means 38' such that the end members 42 of the braces are urged outwardly. The vertical disposition of the legs or supports 28 & 44' is assured by the transverse members 32.

Each lower tubular longitudinal frame member 14' extends to one vertical support member 44' and in conjunction with structural brace 44 and an axle 46' provides support for a wheel 46. Each wheel is rotatably attached to a vertical member 44' and serves as the propulsion wheel and support for the apparatus at its front end.

A smaller diameter hand wheel 48 is provided for grasping by the patient, and is concentric with the supporting wheel 46 and has a suitable surface for grasping by the patient to provide movement of the device by hand power, as applied to the wheels 48. For steering, the vertical support members 28 each include a lower terminal end 50' to which is affixed a caster or swivel mounted wheel 50.

A collapsing of the gurney is achieved by removal of the transverse members 32 and thence the diagonal bracing structure 38, and the removal of transverse members 16 and 18 after which the legs or vertical supports 28, 44 & 44', along with their attached wheels, may be folded.

A pivotal connection between the vertical supports and the horizontal frame members may be provided by an appropriate coupling 30, as shown in FIG. 2.

As shown in FIG. 1, at least one end member 18 may be removably attached to the top frame members 14—14 such as by the removable lock pins 33 whereupon an extension section 35 having a top surface 37 similar to the main surface 20, may be removably secured to the frame members 14. Alternately, the extension section 35 may be attached directly to the end member 18. In any case, releasable straps 39—39 facilitate such attachment. Appropriate bracing 41 abuts the undercarriage of the gurney to maintain the adjacent top surfaces 20 & 37 in a coplanar relationship.

In use of the present apparatus, the reclining patient reaches down to grasp one or both of the hand wheels 48 and by turning same imparts mobility to the gurney. Alternately, a suitable motor mechanism (not shown) may be included to permit ease of mobility by individuals incapable of self operating the apparatus. Braking means 54 is provided with a handle 56 and is pivotally affixed to brace 45, allowing the user to turn device by selectively braking one wheel.

What is claimed is:

1. A collapsible gurney comprising;

a plurality of upper longitudinally extending side and transverse end support members defining a support frame, a patient supporting surface stretched across said support frame, a plurality of normally vertically disposed support members including pairs of head and foot members extending downwardly from opposite ends of said support frame, coupling means pivotally joining an upper end of said vertical members to said support frame side support members, a pair of lower longitudinal side support members fixedly attached to the lower portions of said vertical support members, a pair of diagonal brace elements joined to one another and each having opposite ends respectively joined to one said upper and lower side support member to normally maintain said gurney in an erect condition by immobilizing said coupling means, caster wheels attached to the lower end of said vertical foot members, main support wheels having fixed axles attached adjacent said head vertical support members and provided with attached separate concentric hand driving wheels, whereby a patient reposing atop said supporting surface may self-propel said gurney with their hands grasping said driving wheels while remaining prone to displace the gurney in either a straightline direction or an angular direction.

2. A gurney according to claim 1 wherein, said diagonal brace elements are removably mounted whereby removal of said diagonal brace elements permits pivoting of said coupling means and collapse of said vertical support members relative said support frame.

3. A gurney according to claim 1 including, an extension section removably attached to one said transverse end support member whereby, said patient supporting surface is longitudinally extendable.

* * * * *